SEARCH ROOM Draftsm

BEST AVAILABLE COPY

Aug. 12, 1924. Re. 15,889

J. R. TACKETT

BRICK MACHINE

Original Filed Sept. 16, 1922 5 Sheets-Sheet 1

WITNESS:

INVENTOR

James R. Tackett

BY

Augustus B. Stoughton.

ATTORNEY.

Aug. 12, 1924. Re. 15,889

J. R. TACKETT

BRICK MACHINE

Original Filed Sept. 16, 1922 5 Sheets-Sheet 2

INVENTOR

James R. Tackett

BY

Augustus B. Stoughton

ATTORNEY.

WITNESS:

R. L. Ritchie

Aug. 12, 1924. Re. 15,889

J. R. TACKETT

BRICK MACHINE

Original Filed Sept. 16, 1922 5 Sheets-Sheet 3

INVENTOR

WITNESS:

Robt P. Mitchel.

James R. Tackett

BY

Augustus B. Stoughton.

ATTORNEY.

Draftsman
Aug. 12, 1924. Re. 15,889
J. R. TACKETT
BRICK MACHINE
Original Filed Sept. 16, 1922 5 Sheets-Sheet 4
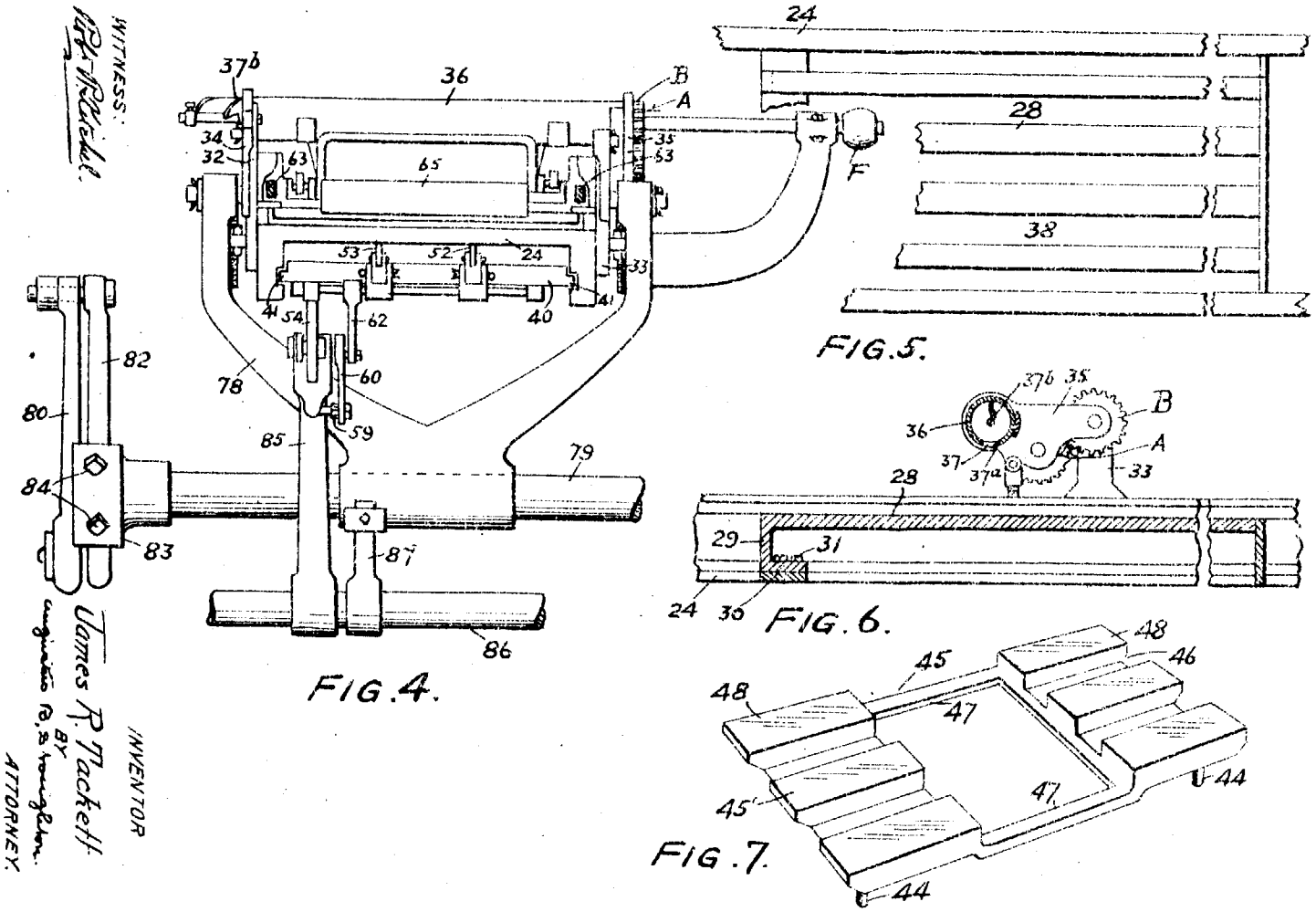
WITNESS:
Robt. R. Kiehel.
INVENTOR
James R. Tackett
BY
Augustus B. Stoughton.
ATTORNEY.

Aug. 12, 1924.
Re. 15,889
J. R. TACKETT
BRICK MACHINE
Original Filed Sept. 16, 1922 5 Sheets-Sheet 5
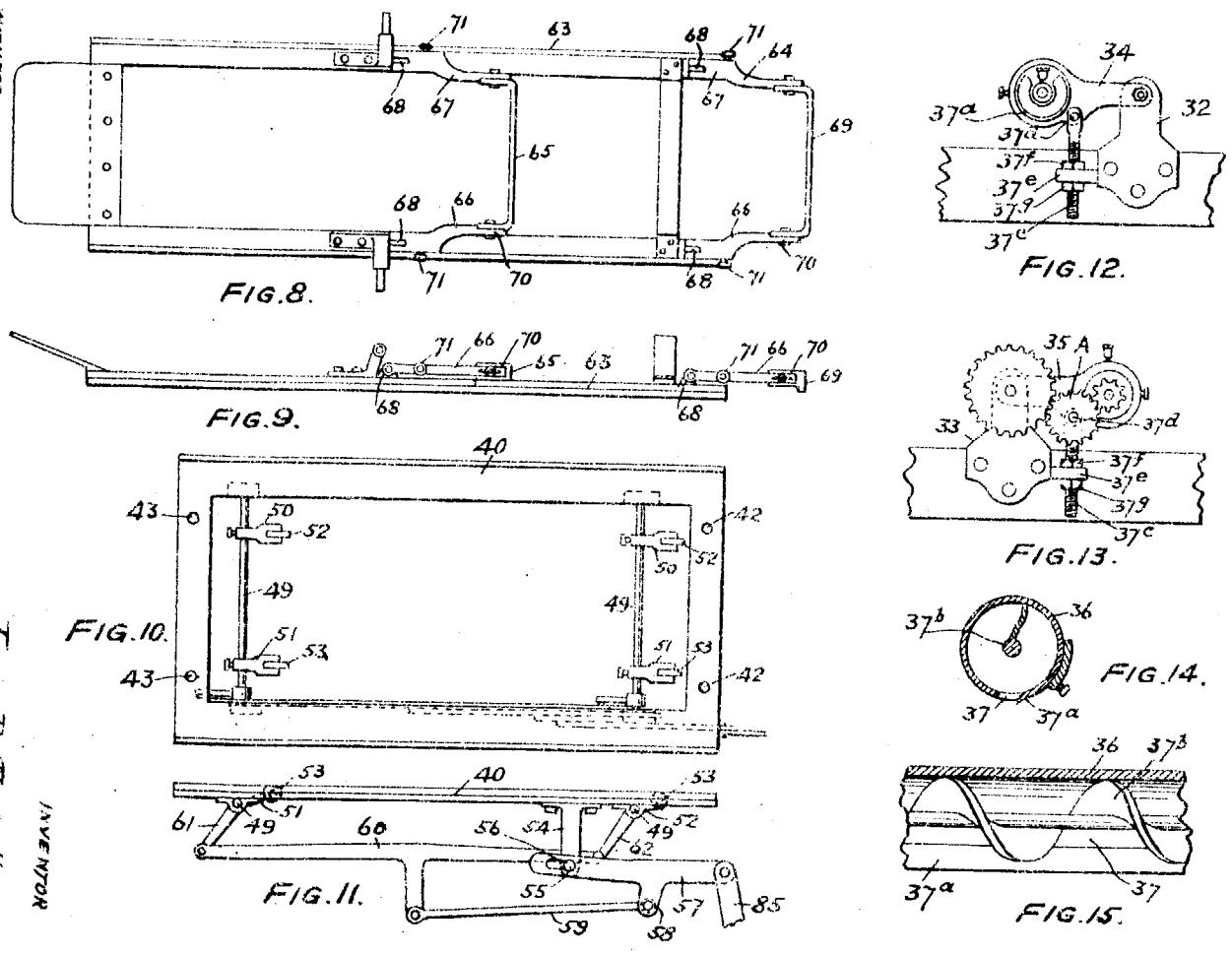
WITNESS:
Robt R. Kitchel
INVENTOR
James R. Tackett
by
Augustus B. Stoughton
ATTORNEY.

Draftsman

Reissued Aug. 12, 1924. Re. 15,889

UNITED STATES PATENT OFFICE.

JAMES R. TACKETT, OF OLIVE HILL, KENTUCKY, ASSIGNOR TO GENERAL REFRACTORIES COMPANY, OF PHILADELPHIA, PENNSYLVANIA, A CORPORATION OF PENNSYLVANIA.

BRICK MACHINE.

Original No. 1,460,455, dated July 3, 1923. Serial No. 588,715, filed September 16, 1922. Application for reissue filed July 2, 1924. Serial No. 723,840.

*To all whom it may concern:*

Be it known that I, JAMES R. TACKETT, a citizen of the United States of America, and resident of Olive Hill, in the county of Carter and State of Kentucky, have invented certain new and useful Improvements in Brick Machines, of which the following is a specification.

This invention relates to brick making machinery, and particularly to a pressing and re-pressing mechanism, associated with an interposed brick sizing device and with conveyers of novel construction for moving the bricks from the primary press into position to be acted on by the sizing device or trimmer, and progressively to the secondary press or what is usually regarded as the "re-press."

It is a further object of this invention to produce a brick conveying mechanism interposed between the presses, by which the bricks are elevated free of the table, moved longitudinally thereof, and re-deposited thereon and adapted to act in time with other mechanism for engaging the bricks after they have been advanced in the manner indicated; the said other mechanism being effective to push the bricks forward in their travel from one press to the other.

It is also a part of the present invention as auxiliary to the first mentioned mechanism, to provide means for operating the said conveying devices through motion imparted from the press operating mechanisms, and more specifically it is an object to impart motion to the two types of conveyers oppositely in order that the pushers may be returning toward the front of the machine while the elevators and carriers are moving the bricks toward the rear of the machine.

It is furthermore an object of this invention to produce a brick sizing trimmer which is assembled in adjustable relation to the brick supporting device, the said trimmer being operative to remove a certain amount of material from the bricks to give them the required dimensions prior to their being presented to the re-presser; the said trimmer including means by which the cuttings are conveyed laterally of the frame of the machine and supplied with operating mechanism actuated in conjunction with the power transmitting mechanisms of the other parts of the machine.

With the foregoing and other objects in view, the invention consists in the details of construction, and in the arrangement and combination of parts to be hereinafter more fully set forth and claimed.

In describing the invention in detail, reference will be had to the accompanying drawings, forming part of this application wherein like characters denote corresponding parts in the several views, and in which—

Figure 4 illustrates a sectional view on the line 4—4 of Fig. 3;

Figure 5 illustrates a plan view of the bed plate.

Figure 6 illustrates an enlarged detailed sectional view of a fragment of the bed plate showing the relation of the trimmer thereto;

Figure 7 illustrates a perspective view of a portion of the brick lifting and conveying mechanism;

Figure 8 illustrates a plan view of a reciprocating frame;

Figure 9 illustrates a side elevation thereof;

Figure 10 illustrates a plan view of the brick lifting and conveying frame;

Figure 11 illustrates a side elevation thereof;

Figure 12 illustrates a side elevation of a fragment of the main frame of the machine and the trimmer mounted thereon;

Figure 13 illustrates an elevation of the same device on the opposite side;

Figure 14 illustrates a sectional view of the combined trimmer and conveyer; and Figure 15 illustrates a longitudinal sectional view of a fragment thereof.

Figure 1:
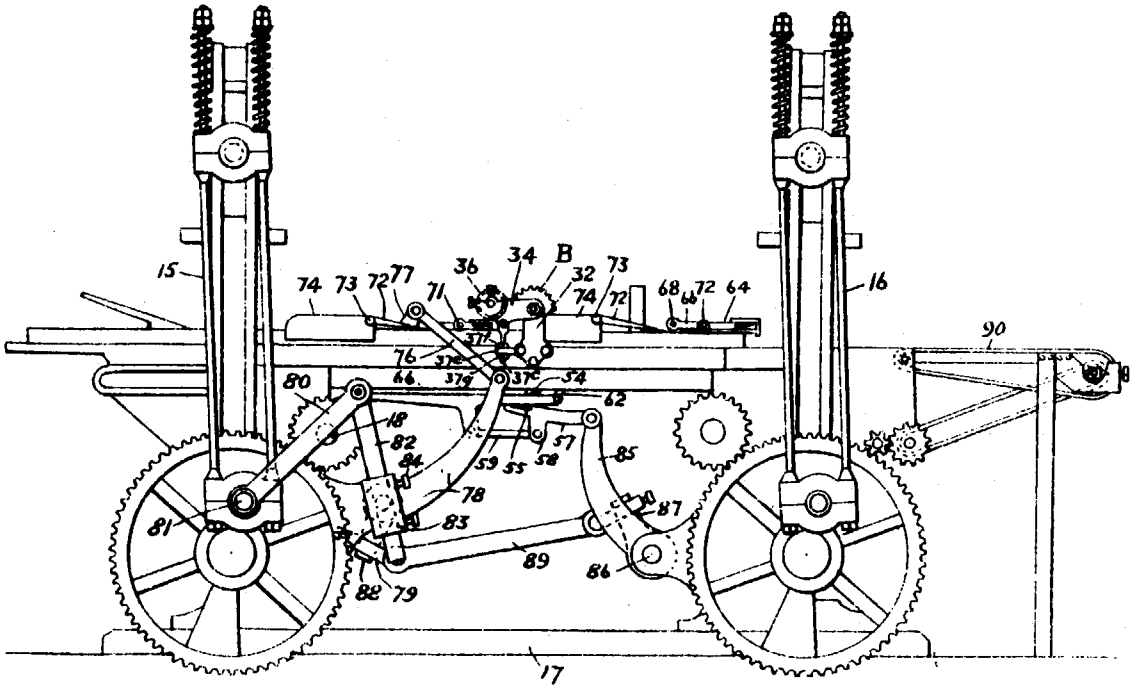
Figure 1 illustrates a view in side elevation of a brick working machine embodying the invention.
Figure 2:
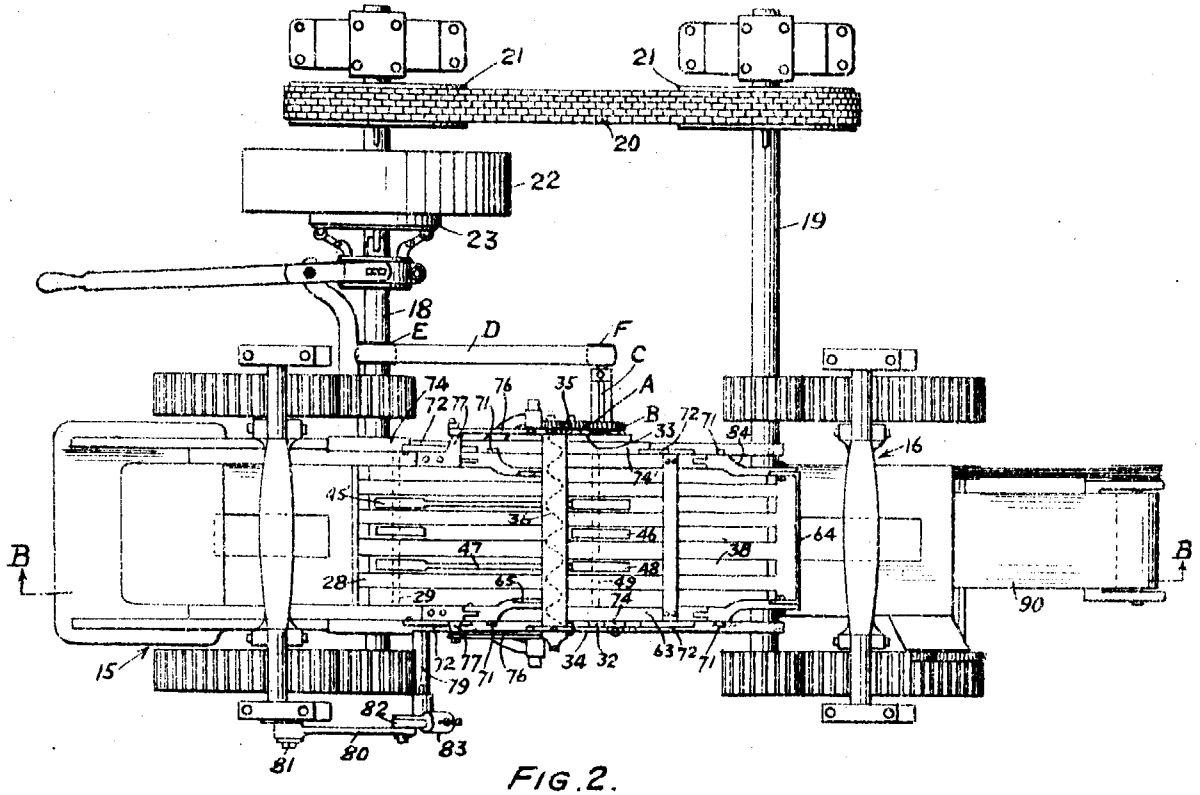
Figure 2 illustrates a top plan view thereof.
Figure 3:
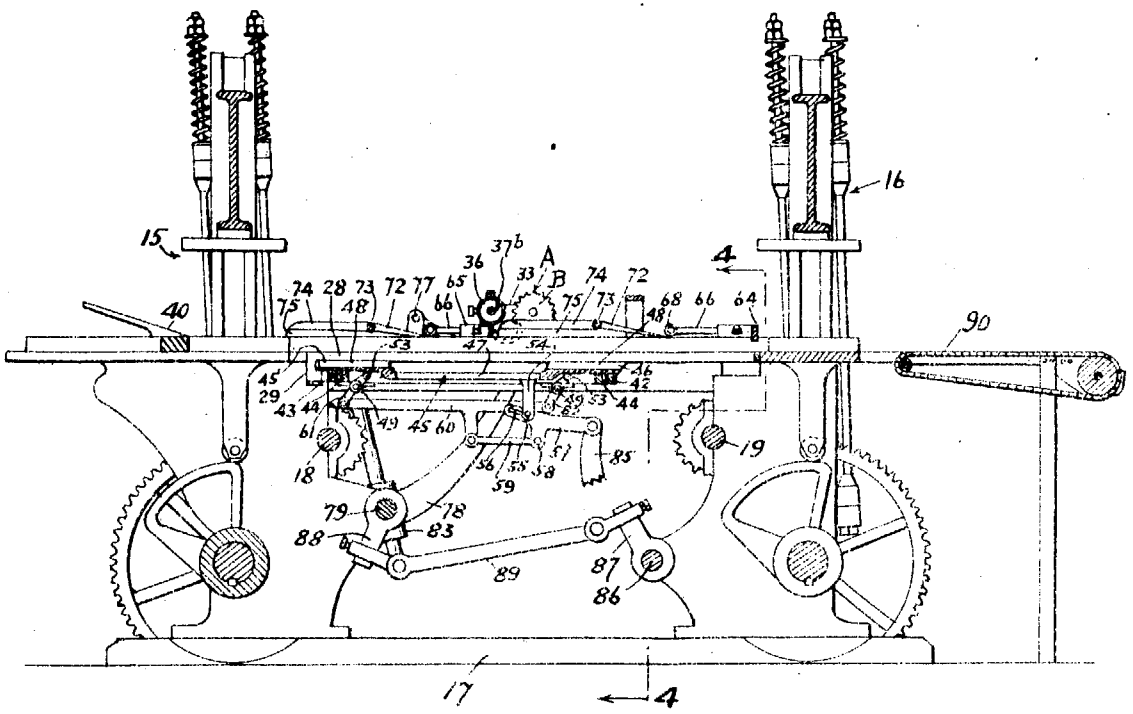
Figure 3 illustrates a sectional view on the line B—B of Fig. 2.

In these drawings, 15 denotes a brick pressing machine and 16 a brick re-pressing machine which are in associated relation to one another, and for convenience of installation or for other reasons, may be assembled on a base 17. The brick pressing machines may be of any conventional type, and the inventor does not wish to be limited with respect to the details of construction thereof.

Those here illustrated are of a well known manufacture, and it is believed their construction and operation will be apparent without any elaborate explanation of their construction or operation.

For convenience in the description, the end of the machine at which the press 15 is stationed will be regarded as the front end, since the bricks to be pressed are fed in at that end, whereas the end of the machine at which the press 16 is stationed will be regarded as the rear end of the machine, since it is at this end that the finished product is removed from the conveyers, as will presently appear.

The shafts 18 and 19 are connected together by a chain 20 operating over sprocket wheels 21, the chain being preferably of the silent type which will prove effective to operate the two pressers in unison. Its power wheel 22 may be driven in any suitable manner from a source of power, and a controlling clutch 23 is employed for disconnecting the drive from the shaft. These features are well known mechanical expedients and will be understood by one skilled in the art without further detail explanation.

The bed plate is rigid and constitutes a support with relation to or on which bricks are moved toward the rear of the machine by mechanism to be hereinafter described.

In the construction of the bed plate, ribs or slats 28 are employed to form what might be termed a "grid" on which the bricks may slide, and the spaces between the ribs may be proportioned according to the requirements in practice. The rear ends of the ribs have downwardly extending portions 29 terminating in flanges 30 which fit on the main frame of the front presser and these are secured in place by suitable fastenings 31 such as bolts or the like. The rear ends of the ribs are connected to the rear press in suitable manner.

The brick trimming mechanism is located between the ends of the bed plate, and brackets 32 and 33 are secured at opposite sides of the bed plate and rise therefrom. Arms 34 and 35 respectively are oscillatively mounted on the brackets and are intended to carry the brick trimmer which, in the present embodiment of the invention, comprises a cylindrical member 36 having a slot 37 at its lower side, the edge of the slot constituting or being provided with a knife $37^a$ which will serve to trim the bricks, the trimmings therefrom entering the slot 37. A screw conveyer $37^b$ is rotatably mounted in the cylindrical member and provision is made for rotating it in order that the trimmings will be carried longitudinally of the cylindrical member to one side of the machine where they will be deposited clear of the operating mechanism.

The trimmer is stationary with relation to its carrying arms, but the carrying arms are adjustable with relation to the bed plate, each of said arms having an identical device, in the present embodiment, for effecting the adjustment. The construction of this adjusting device is well shown in Figures 12 and 13, it being seen that a threaded shank $37^c$ is connected to the arm by a pivot $37^d$, and the said shank passes through an extension $37^e$ of the bracket, and it is adjustably secured therein by nuts $37^f$ and $37^g$. By the means just indicated, the trimmer may be elevated or lowered with respect to the bed plate to increase or diminish the thickness of the trim as the bricks pass thereunder through the action of the conveyers.

The conveyer is driven by a train of gearing A, shown in Figure 13, a pinion B of which is connected to a shaft C driven from the shaft 18 by a belt D, associated with pulleys E and F.

After the bricks have reached an advanced position on the bed plate, and after another brick has been delivered to the front end of the bed plate, provision has been made, in a manner to be presently explained, for lifting certain bricks free of the bed plate and for carrying them rearwardly a certain distance or step in order that they may be reached and engaged by pushing conveyers in their reciprocation. In order to impart this initial movement to the bricks, the bed plate is provided with slots 38 to form clearances for the brick engaging elements which travel in the slots. A rectangular frame 40 is shown as guided in slots 41 formed in the inner surface of the frame 24, and the said frame 40 has pairs of apertures 42 and 43 in its end to receive the dowels or pins 44 depending from the conveying element 45. The conveying element is here shown as comprising solid end members 45′ and 46 connected by ribs 47, one of which is arranged at each side. The end members have projections 48 on their upper faces which fit in the slots of the bed plate, and they are of such height as to extend from below to a plane above the upper surfaces of the bed plate when the conveyer has been fully elevated.

Means are provided for reciprocating the conveyer vertically and longitudinally. To that end, shafts 49 are journalled on the frame 40 and each shaft has arms 50 and 51 carrying an anti-friction roll 52 and 53 respectively, which bear against the under side of the conveyer and the under surface of the ends 45 and 46 when the shaft 49 is rotated, and these arms are effective in elevating the conveyer with relation to the frame 40, since the dowel pins 44 are free to move in the apertures of the frame, and the relation of parts is such that when the conveyer is elevated, it will come in contact with certain bricks that are on the bed plate and lift the said bricks free of the said bed plate. As power is imparted to the conveyer, it is moved longitudinally while in its elevated position and thus it will carry the bricks which it supports toward the rear of the machine where they are deposited when the conveyer descends, upon motion being imparted to the shafts 49 to rotate them in a direction opposite to that in which they were rotating when the conveyer was elevated.

The conveyer under discussion will therefore have a movement in sequence in an upward direction to lift the bricks from the bed plate longitudinally of the machine to transport the bricks rearwardly and in a downward movement which will result in depositing the bricks on the bed plate.

An arm 54 depends from the frame 40, and it has a stud 55 entering a slot 56 of the link 57 so that the link slides on the stud a distance equaling the length of the slot, and thereafter, movement of the link is communicated to the frame to impart the reciprocating movement to the frame. The link has an ear 58 to which a rod 59 is connected, and the said rod has its opposite end attached to a link 60 in any suitable way, in order that the thrust movements of the link 57 will, through the rod 59, be communicated to the link 60. The ends of the link 60 are pivotally connected to arms 61 and 62 that are attached to the shafts 49, so that as the link 57 is reciprocated, it communicates motion first to the shafts 49 to oscillate the arms 50 and 51, and then communicates motion to the frame to reciprocate it; hence, the vertical and reciprocating motion is communicated to the conveyer.

The reciprocating conveyer which coacts with the conveyer just described, includes in its construction a reciprocating frame 63 which is mounted to move with relation to and inside of the frame 24 over the bed plate. The frame 63 has a pusher 64 at its rear end and a pusher 65 between its ends. These pushers are of identical construction, in the present embodiment of the invention, and each comprises the side arms 66 and 67 hinged to lugs or ears 68 carried by the frame, and the arms of each pair are connected by a yoke 69 which may be adjustably connected to the arms by fastenings 70, such as nuts or the like. The arms are slotted so that the yokes may project a greater or less extent beyond the arms, according to the throw or movement desired during the operation of the machine. Each arm carries an anti-friction roller 71 and the rollers are intended to engage and travel on switches or frogs 72. Each frog, in the present embodiment of the invention, has its front end mounted on a pivot 73 and is normally supported in an inclined position in order that the anti-friction rollers may travel up the switches when it is being moved forward and may move under the switches when they are moving toward the rear of the machine. It is shown in the drawing that the pivots for the switches are carried by ribs 74 that constitute elevated tracks over which the anti-friction rollers ride when the conveyer is being moved toward the front of the machine. The ribs have their inner faces channeled, as shown at 75, to form a clearance in which the anti-friction rollers travel toward the rear of the machine, and when traveling toward the rear of the machine, the anti-friction rollers ride under the switches, since the said switches are free to be swung on their pivots.

The movement of the frame 63 is such as to carry the pushers 64 and 65 toward the front of the machine such distance as to allow the said pushers to drop back of the bricks which have been given their initial rearward movement on the bed plate by the first described conveyer, and the rearward movement of these pushers is such that the pusher at the front end of the machine delivers its bricks under the trimming knife for sizing the bricks, and the other pusher delivers the bricks into position to be received by the re-presser.

Motion is imparted to the reciprocating frame 63 by a plurality of elements which, in the present embodiment of the invention, include a link 76 connected to a lug or ear 77 on the frame and to an arm 78 that is attached to a shaft 79, the said shaft 79 being rocked through the medium of a pitman 80 on the wrist pin 81 of the press eccentric and a rod 82 that is adjustable in a block 83 on the said shaft 79. The rod 82 is adjustable in the block and is held in different positions of adjustment by set screws 84, so that the throw of the arms 78 may be increased or diminished, according to the position of the rod 82 in the said block.

As the pressing machine 15 is being operated, it will communicate motion, through the instrumentalities just indicated, to the said reciprocating frame and operate the conveyer that moves the bricks certain of the steps.

Provision is made for operating the link 57 by an arm 85 that is rigid on a shaft 86, the said provision including means that are connected to and take motion from the shaft 79. As shown in this embodiment of the invention, an arm 87 is attached to the shaft 86 and an arm 88 is attached to the shaft 79. The arms 87 and 88 are connected by a thrust rod 89 and therefore, the motion of the shaft 79 is communicated to the shaft 86. The arrangement is such that when one conveyer is moved rearwardly, the other is being moved forwardly and vice versa, and while the inventor does not wish to be limited as to the details of construction and the arrangement of parts by which this is accomplished, one means for effecting this movement is here illustrated.

The conveyer 90 at the rear of the machine beyond the re-presser is of conventional type and is intended to be operated to remove bricks from the machine in their finished state.

As the construction and function of the elements of the machine have been stated, in connection with a description of the elements and their relation to one another, the disclosure is believed to be sufficiently full to enable one skilled in the art to carry the invention into practice, without a resumé of a description of a cycle of operation of the machine.

I claim:

1. In a brick treating machine, a brick press, a brick re-press in spaced relation to each other, a brick support interposed between the presses on which bricks are transferred from one press to the other, horizontally reciprocating brick pushing elements for engaging bricks and pushing them over the support, vertically and longitudinally reciprocating brick carrying elements in operative relation to the support for lifting the bricks from the support and transferring them longitudinally thereof and re-depositing them thereon, and means for operating the brick pushing elements and brick carrying elements oppositely.

2. In a brick treating machine, a brick press, a brick re-press in spaced relation to each other, a brick support interposed between the presses on which bricks are transferred, pushing elements for engaging the bricks and pushing them over the support, lifting and transferring elements co-acting with the pushers for moving the bricks certain steps in their progress from one press to the other, and means for operating the brick pushing elements and brick transferring elements oppositely.

3. In a brick treating machine, a brick press, a brick re-press in spaced relation to each other, a brick support interposed between the presses on which bricks are transferred, pushing elements for engaging the bricks and pushing them over the support, lifting and transferring elements coacting with the pushers for moving the bricks certain steps in their progress from one press to the other, means for operating the brick pushing elements and brick transferring elements oppositely, and a brick trimmer in the path of travel of the bricks while under the influence of one of the pushing elements.

4. In a brick treating machine, a brick press, a brick re-press in spaced relation to each other, a brick support interposed between the presses on which bricks are transferred, pushing elements for engaging the bricks and pushing them over the support, lifting and transferring elements coacting with the pushers for moving the bricks certain steps in their progress from one press to the other, means for operating the brick pushing elements and brick transferring elements oppositely, a brick trimmer comprising a cylindrical member having a slot in its wall and a knife at the edge of the slot, means for oscillatably mounting the cylindrical member, and a screw conveyer operatively mounted within the said member.

5. In a brick treating machine, a brick press, a brick re-press in spaced relation to each other, a brick support interposed between the presses on which bricks are transferred, pushing elements for engaging the bricks and pushing them over the support, lifting and transferring elements coacting with the pushers for moving the bricks certain steps in their progress from one press to the other, means for operating the brick pushing elements and brick transferring elements oppositely, a brick trimmer comprising a cylindrical member having a slot in its wall and a knife at the edge of the slot, means for oscillatably mounting the cylindrical member, a screw conveyer operatively mounted within the said member, and means for adjusting the position of the member supporting elements.

6. In a brick treating machine, a support, brick transferring means coacting with the support, a brick trimmer adjustably held above the support, the said trimmer comprising a cylindrical member having a slot with a knife at the edge thereof, and a screw conveyer within the cylindrical member for moving the cuttings longitudinally of the cylindrical member.

7. In a brick treating machine, a brick press, a brick re-press in spaced relation to each other, a support between the said presses on which bricks are transferred from one press to the other, tracks at the sides of the support, switches hinged to the tracks and acting as guides, a frame mounted for reciprocation with relation to the support, brick pushing elements pivotally connected to the frame and having members engaging the switches whereby the pushing elements are carried over the switches to the tracks, means for operating the frame to move the brick pushing elements to the rear of the tracks and free thereof, the said brick pushing elements being operative on their pivots to fall into operative position to push bricks resting on the support and adapted to travel under the switches during their rearward motion, and means for reciprocating the frame.

8. In a brick treating machine, a brick press, a brick re-press in spaced relation to each other, a support between the said presses on which bricks are transferred from one press to the other, elevated surfaces at the sides of the support, oscillatable elements at the rear ends of the elevated surfaces operating as guides, brick pushing devices, a reciprocating frame to which the pushing devices are pivotally connected, means for moving the frame longitudinally of the support and for carrying the pushing elements over the guide end elevated surfaces to the ends of said elevated surfaces whereby the said pushing elements fall to positions in rear of bricks on the support for moving the bricks longitudinally of the support.

9. In a brick treating machine, a brick press, a brick re-press in spaced relation to each other, a support between the said presses on which bricks are transferred from one press to the other, elevated surfaces at the sides of the support, oscillatable elements at the rear ends of the elevated surfaces operating as guides, brick pushing devices, a reciprocating frame to which the pushing devices are pivotally connected, means for moving the frame longitudinally of the support and for carrying the pushing elements over the guide and elevated surfaces to the ends of said elevated surfaces whereby the said pushing elements fall to positions in rear of bricks on the support for moving the bricks longitudinally of the support, and an adjustable brick trimming mechanism located at the zone of the support where bricks are being moved under the influence of the pushing elements.

10. A brick treating machine comprising a brick press and a brick re-press in spaced relation to each other, a brick trimmer arranged between said presses, and a conveyer interposed between said presses and extending from one to the other of them and spaced beneath and clear of the brick trimmer.

JAMES R. TACKETT.